(12) United States Patent
Li et al.

(10) Patent No.: US 6,315,309 B1
(45) Date of Patent: Nov. 13, 2001

(54) CARRIER WITH 360° ROTATABLE FRONT WHEEL UNIT

(75) Inventors: Jung-Hua Li, Chang-Hua; Chi-Cheng Lai, Taichung, both of (TW)

(73) Assignee: Chin-Chiao Chen, Taichung Hsien (TW)

( * ) Notice: Subject to any disclaimer, the term of this patent is extended or adjusted under 35 U.S.C. 154(b) by 0 days.

(21) Appl. No.: 09/482,307

(22) Filed: Jan. 12, 2000

(51) Int. Cl.$^7$ ...................................................... B62B 7/08
(52) U.S. Cl. ..................... 280/47.38; 280/642; 280/658; 188/2 D; 188/19
(58) Field of Search .................................. 280/38, 47.34, 280/47.38, 641, 642, 1.5, 657, 658; 188/2 D, 29, 19

(56) References Cited

U.S. PATENT DOCUMENTS

| | | | | |
|---|---|---|---|---|
| 4,664,395 | * | 5/1987 | McCoy .................................... | 280/1.5 |
| 5,669,624 | * | 9/1997 | Eichhorn ................................ | 280/642 |
| 5,863,061 | * | 1/1999 | Ziegler et al. ......................... | 280/642 |
| 5,983,745 | * | 11/1999 | Petrak .................................... | 188/2 D |

* cited by examiner

Primary Examiner—Lanna Mai
Assistant Examiner—Hau Phan
(74) Attorney, Agent, or Firm—Townsend and Townsend and Crew LLP

(57) ABSTRACT

A carriage includes a carriage frame having a wheeled rear frame portion and a front wheel-carrying frame portion. The front wheel-carrying frame portion has a lowermost section that defines a vertical accommodating hole which extends in an axial direction. A front wheel unit includes a fork mounting member disposed rotatably in the accommodating hole and having a fork connecting portion that extends downwardly and outwardly of the accommodating hole, and a retaining portion opposite to the fork connecting portion in the axial direction. A fork unit has an upper end fixed to the fork connecting portion of the fork mounting member and co-rotatable therewith, and a lower end with a wheel mounted rotatably thereon about a horizontal axis. A locking member is provided on the lowermost section of the front wheel-carrying frame portion for retaining rotatably the retaining portion of the fork mounting member in the accommodating hole.

7 Claims, 7 Drawing Sheets

CARRIER WITH 360° ROTATABLE FRONT WHEEL UNIT

BACKGROUND OF THE INVENTION

1. Field of the Invention

The invention relates to a carriage, more particularly to a carriage with a 360° rotatable front wheel unit.

2. Description of the Related Art

Referring to FIG. 1, a conventional baby carriage is shown to include a carriage frame 10 that has a front frame portion provided with a front wheel 15, and a rear frame portion provided with a pair of rear wheels 13 (only one is visible in FIG. 1). A seat member 11 is disposed between the front and rear frame portions. A footrest 14 is mounted on the front frame portion below the seat member 11. An inverted U-shaped handlebar 12 has two lower connecting ends connected securely to a backrest 111 of the seat member 11.

Some disadvantages of the aforesaid conventional carriage reside in that rotation of the front wheel 15 about a vertical axis is limited, thereby inconveniencing the person pushing the conventional carriage. In addition, no brake unit is provided to overcome movement of the carriage on a sloped surface.

SUMMARY OF THE INVENTION

The first object of this invention is to provide a carriage with a 360° rotatable front wheel unit.

The second object of this invention is to provide a carriage with a brake cable unit that does not get entangled with the front wheel unit when the latter rotates about a vertical axis.

Accordingly, a carriage of the present invention includes a carriage frame which consists of a wheeled rear frame portion and a front wheel-carrying frame portion. The front wheel-carrying frame portion has a lowermost section that defines a vertical accommodating hole which extends in an axial direction. A front wheel unit includes a fork mounting member disposed rotatably in the accommodating hole, and having a fork connecting portion that extends downwardly and outwardly of the accommodating hole, and a retaining portion opposite to the fork connecting portion in the axial direction. A fork unit has an upper end fixed to the fork connecting portion of the fork mounting member and co-rotatable therewith, and a lower end with a wheel mounted rotatably thereon about a horizontal axis. A locking member is provided on the lowermost section of the front wheel-carrying frame portion for retaining rotatably the retaining portion of the fork mounting member in the accommodating hole.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
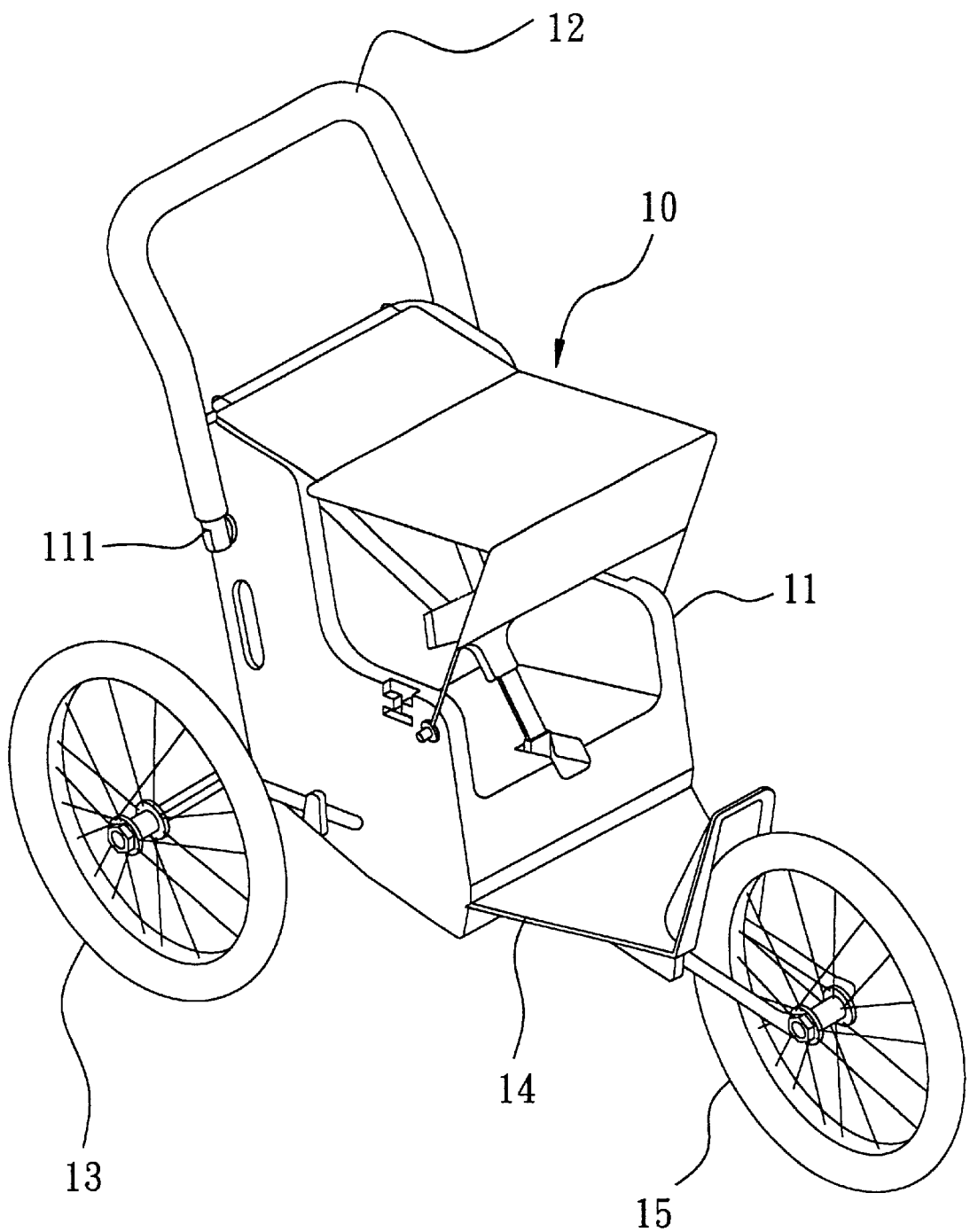
FIG. 1 is a perspective view of a conventional carriage.
Figure 2:
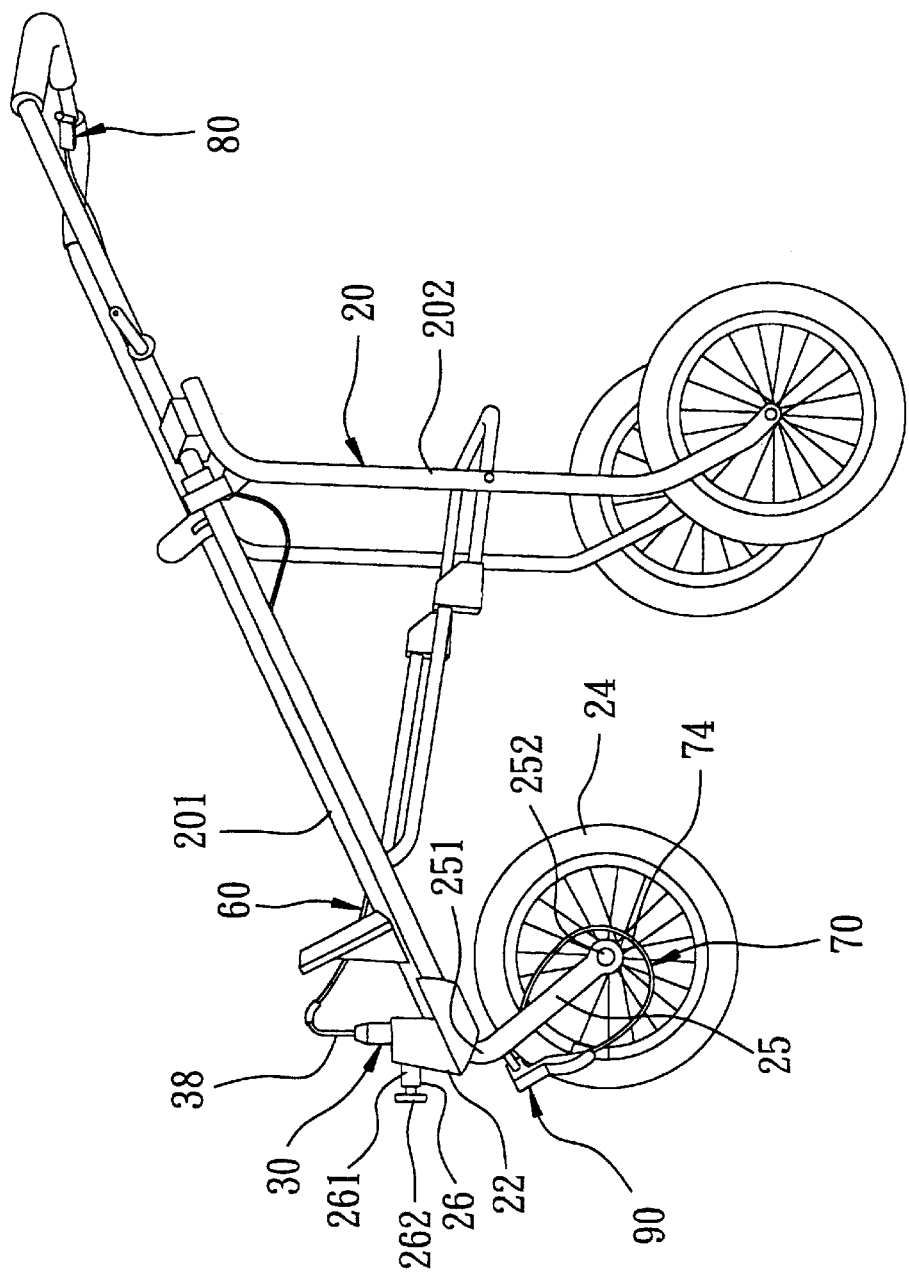
FIG. 2 is a side view of the preferred embodiment of a carriage of the present invention, wherein a seat and a canopy are removed therefrom for the sake of clarity.

Referring to FIGS. 2 to 5, the preferred embodiment of a baby carriage of this invention is shown to include a carriage frame 20 that has a wheeled rear frame portion 202 and a front wheel-carrying frame portion 201.

As illustrated, the front wheel-carrying frame portion 201 has a lowermost section 22 that defines a vertical accommodating hole 221 which extends in an axial direction. A front wheel unit includes a fork mounting member 23 and a fork unit 25. The fork mounting member 23 is disposed rotatably in the accommodating hole 221, and has a fork connecting portion (23D) that extends downwardly and outwardly of the accommodating hole 221, and a retaining portion (23C) opposite to the fork connecting portion (23D) in the axial direction. The fork unit 25 has an upper end 251 fixed to the fork connecting portion (23D) of the fork mounting member 23 and co-rotatable therewith, and a lower end 252 (see FIG. 2) with a wheel 24 mounted rotatably thereon about a horizontal axis.

Figure 3:
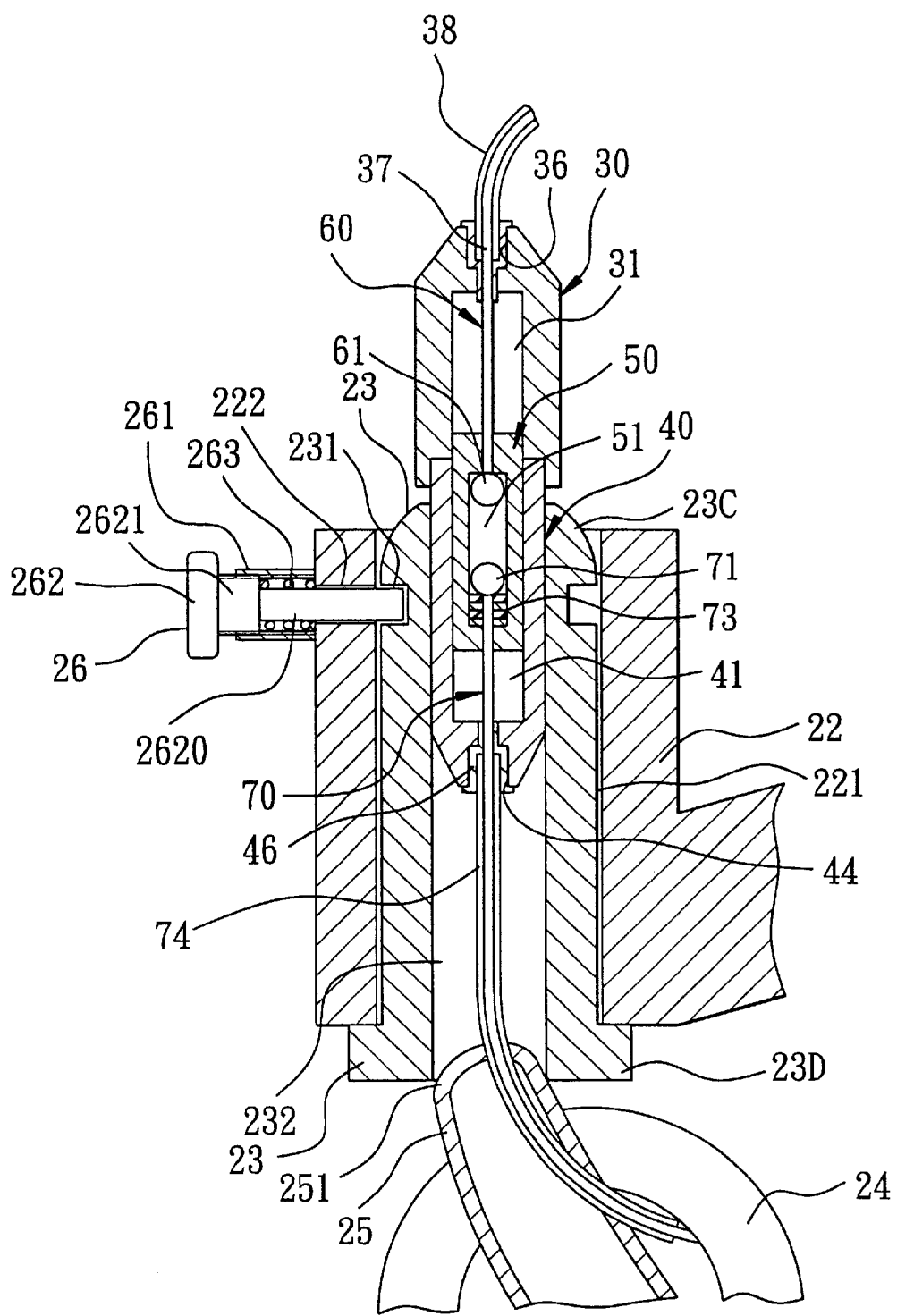
FIG. 3 is a fragmentary sectional view of the preferred embodiment, illustrating a state where a front wheel unit is rotatable about a vertical axis and a brake device thereof is in a non-braking position.
Figure 4:
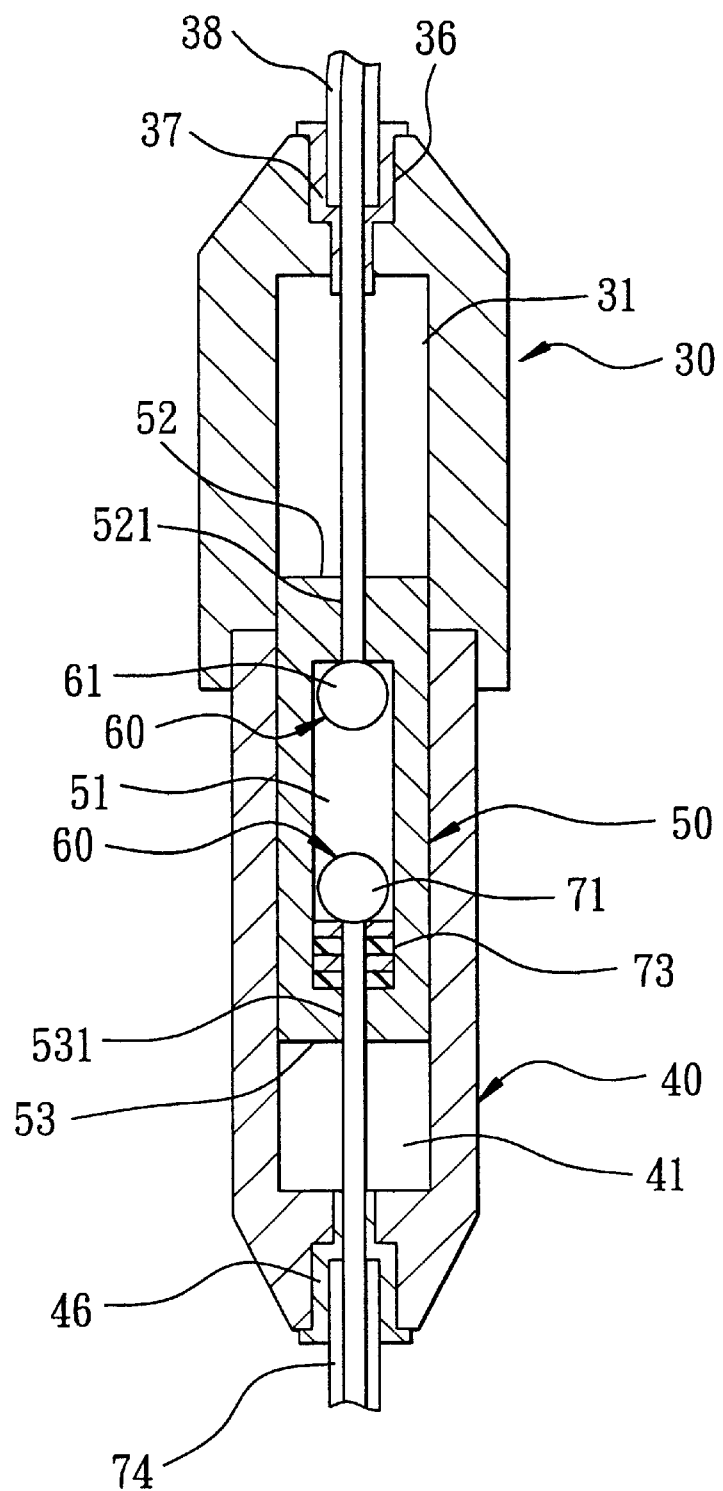
FIG. 4 is an enlarged sectional view of a shuttle casing employed in the preferred embodiment.
Figure 5:
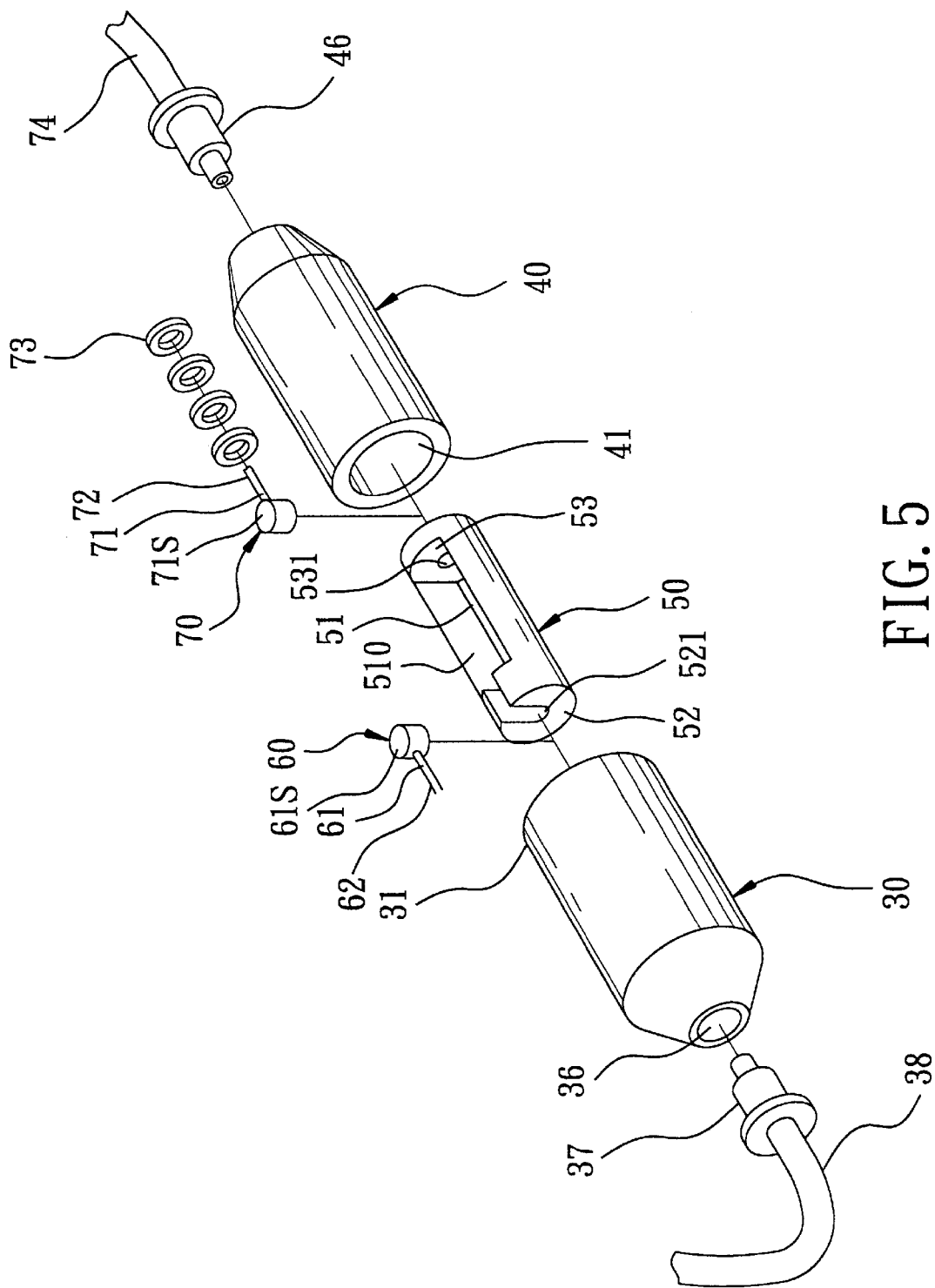
FIG. 5 is an exploded perspective view of the shuttle casing employed in the preferred embodiment, illustrating how first and second brake cables are mounted in the shuttle casing.
Figure 7:
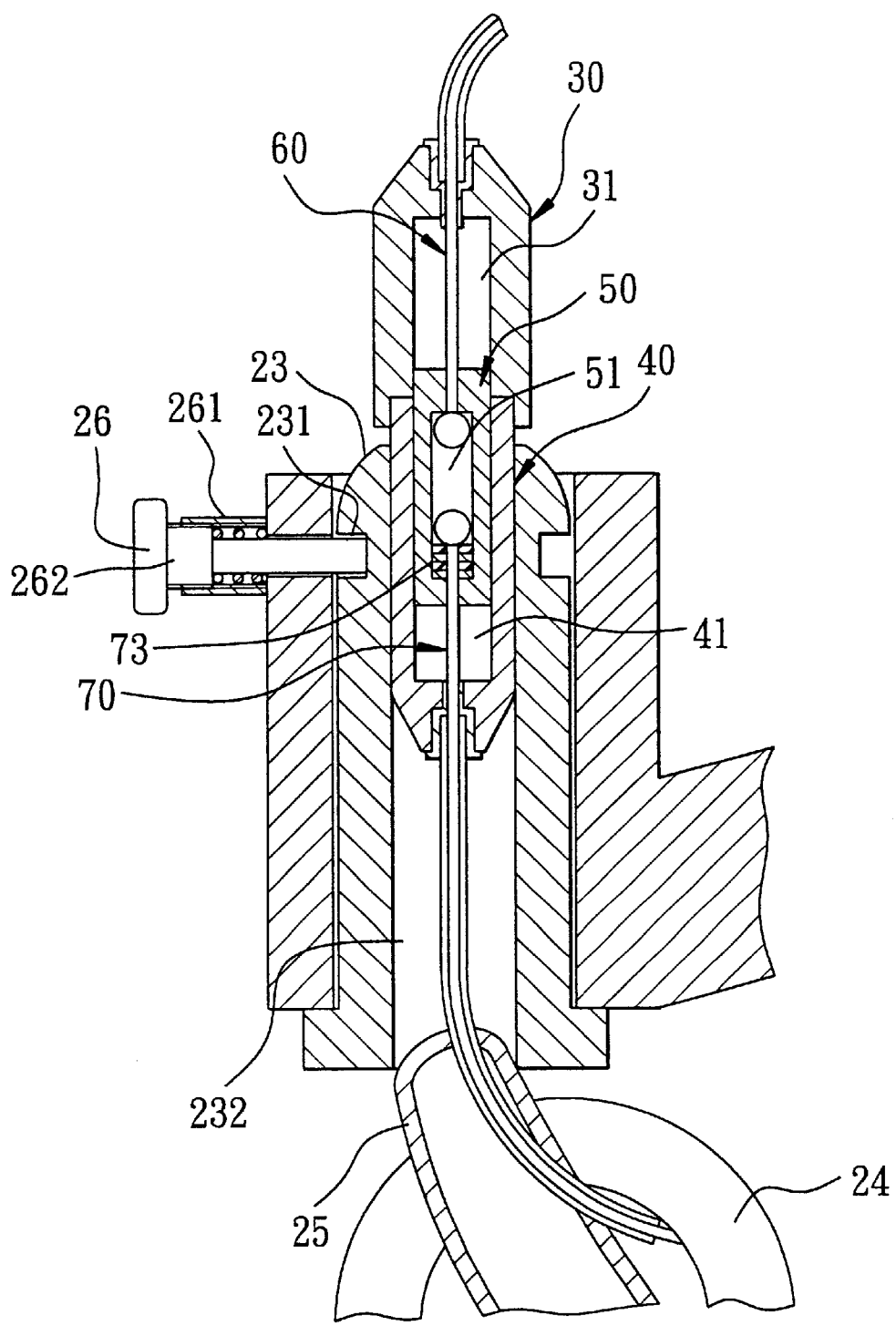
FIG. 7 is a fragmentary sectional view of the preferred embodiment, illustrating a state where the front wheel unit is not rotatable about the vertical axis and the brake device is in the non-braking position.

A locking member 26 is provided on the lowermost section 22 of the front wheel-carrying frame portion 201 for retaining rotatably the retaining portion (23C) of the fork mounting member 23 in the accommodating hole 221. The locking member 26 is operable to move from an unlocking state, where the fork mounting member 23 is rotatable in the accommodating hole 221 about the axial direction, as best shown in FIG. 3, to a locking state, where the fork mounting member 23 is restrained from rotating inside the accommodating hole 221 about the axial direction, as best shown in FIG. 7.

The retaining portion (23C) of the fork mounting member 23 is formed with an annular retaining groove 231 therearound. The lowermost section 22 of the front wheel-carrying frame portion 201 is formed with a radial bore 222 that is registered with the retaining groove 231. The locking member 26 includes a locking bolt 262 that is retained on the lowermost section 22 of the front wheel-carrying frame portion 201, that extends through the radial bore 222 and into the retaining groove 231, and that abuts tightly against the retaining portion (23C) of the fork mounting member 23 inside the retaining groove 231 when operated to the locking state (see FIG. 7).

Preferably, the lowermost section 22 of the front wheel-carrying frame portion 201 is formed with a tubular socket 261 that projects radially and outwardly therefrom and that is coaxial with the radial bore 222. The socket 261 is formed with an internal screw thread. The locking bolt 262 has a shank portion 2620 that is disposed in the socket 261 and that extends through the radial bore 222 and into the retaining groove 231, and an externally threaded head portion 2621 that is connected to the shank portion 2620 and that is formed with an external screw thread to engage threadedly the internal screw thread of the socket 261.

The locking member 26 further includes a biasing spring 263 disposed in the socket 261 and sleeved on the shank portion 2620 of the locking bolt 262. The biasing spring 263 has a first end that abuts against the head portion 2621 of the locking bolt 262, and a second end that abuts against the lowermost section 22 of the front wheel-carrying frame portion 201.

The fork mounting member 23 is further formed with a cable passage 232 that extends in the axial direction.

The carriage of the preferred embodiment further includes a brake lever 80 mounted on the carriage frame 20, a brake device 90 mounted on the fork unit 25, and a brake cable unit that extends through the cable passage 232 in the fork mounting member 23 and that interconnects the brake lever 80 and the brake device 90 such that operation of the brake lever 80 enables the brake device 90 to brake the wheel 24. The brake cable unit includes a hollow shuttle casing retained in the cable passage 232 and having an upper portion 30, a lower portion 40, and a shuttle receiving space 31, 41 that extends between the upper and lower portions 40, 30 in the axial direction. A shuttle member 50 is movably disposed in the shuttle receiving space 31, 41. A first brake cable 60 has a first end 62 connected to the brake lever 80 and a second end 61 that extends through a hole 36 in the upper portion 30 of the shuttle casing and that is connected to the shuttle member 50. A second brake cable 70 has a first end 72 connected to the brake device 90 and a second end 71 that extends through a hole 44 (see FIG. 3) in the lower portion 40 of the shuttle casing and that is connected rotatably to the shuttle member 50. The upper and lower portions 30, 40 of the shuttle casing are in the form of interconnected upper and lower casing parts. A plastic cable sheath 74 has one end terminated by a tubular plug 46 that is fitted into the hole 44 in the lower portion 40 of the shuttle casing. The second brake cable 70 passes through the cable sheath 74. A cable tube 38 has one end terminated by a tubular plug 37 that is fitted into the hole 36 in the upper portion 30 of the shuttle casing. The first brake cable 60 extends through the cable tube 38. The lower portion 40 of the shuttle casing is secured in the cable passage 232, and the upper portion 30 of the shuttle casing extends upwardly and outwardly of the cable passage 232.

Figure 6:
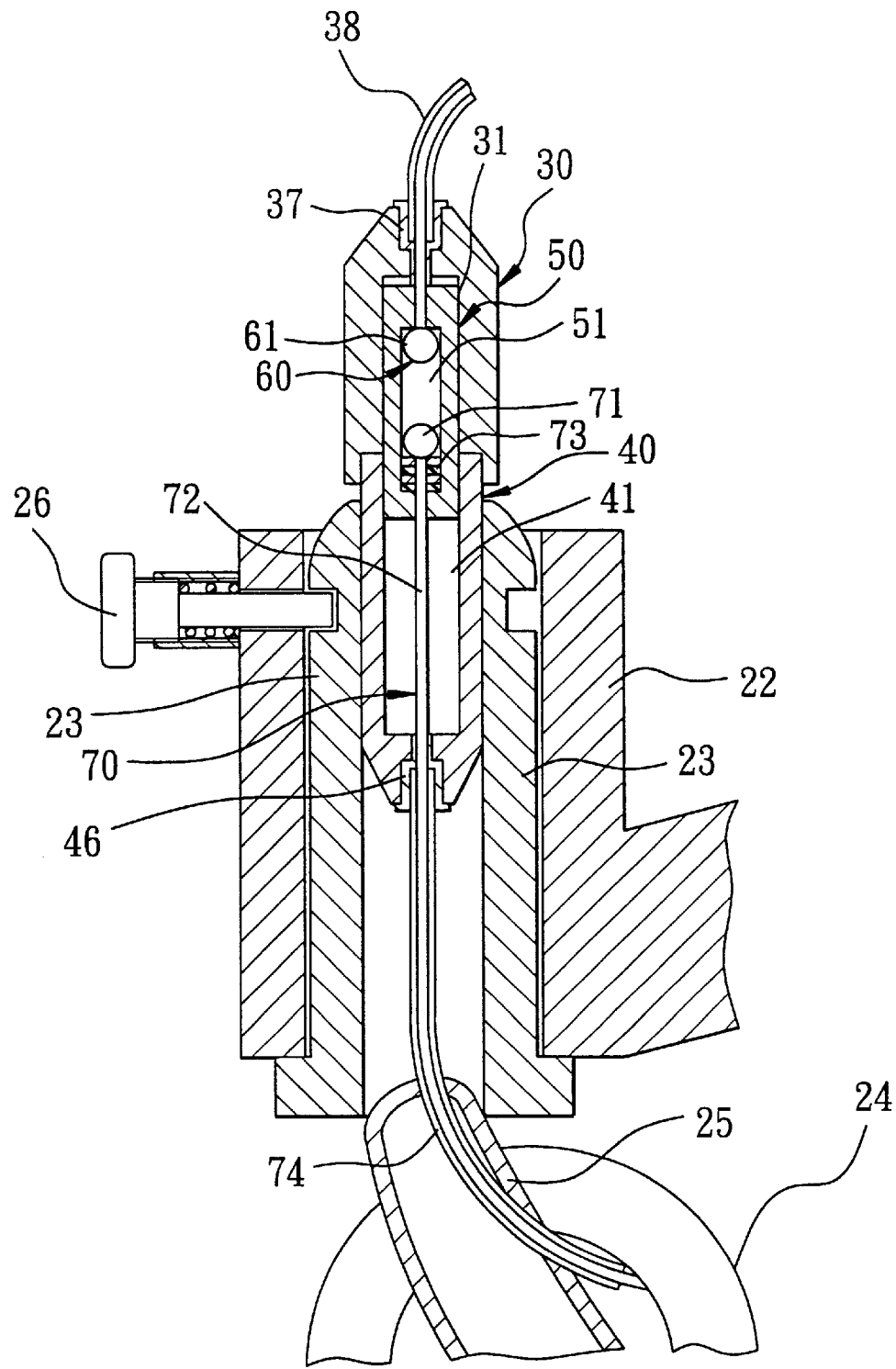
FIG. 6 is a fragmentary sectional view of the preferred embodiment, illustrating a state where the front wheel unit is rotatable about the vertical axis and the brake device is in a braking position.

Preferably, the shuttle member 50 includes a shuttle casing 51 that is formed with a cavity 510 that extends in the axial direction and that has opposite first and second end walls 52, 53. The first end wall 52 is formed with a radial slit 521 communicated with the cavity 510. The second end 61 of the first brake cable 60 extends through the radial slit 521 in the first end wall 52 and is formed with a retaining stud (61S) that is disposed in the cavity 510 and that abuts against the first end wall 52. The second end wall 53 is formed with a cable hole 531 communicated with the cavity 510. The second end 71 of the second brake cable 70 extends rotatably through the cable hole 531 in the second end wall 53 and is further formed with a stop (71S) that is disposed in the cavity 510 and that abuts against the second end wall 53. Since the retaining stud (61S) and the stop (71S) are not fixed in the cavity 510, 360° rotation of the front wheel 24 about the axial direction only results in synchronous rotation of the second brake cable 70. Thus, entangling of the first and second brake cables 60, 70 does not occur when the brake lever 80 is operated from a non-braking position of FIG. 3 to a braking position of FIG. 6. Preferably, a stack of metal washers 73 is sleeved on the second end 71 of the second brake cable 70 and is disposed between the stop (71S) and the second end wall 53 so as to reduce friction between the second brake cable 70 and the shuttle casing 51. Alternatively, the washers 73 can be made of plastic.

The advantages provided by the carriage of the present invention are as follows:

(i) Since the retaining stud (61S) of the first brake cable 60 and the stop (71S) of the second brake cable 70 are not fixed to the shuttle casing 51, rotation of one of the brake cables 60, 70 does not affect the other one of the brake cables 60, 70.

(ii) When desired, the locking device 26 can be operated from the unlocking state to the locking state, where the fork mounting member 23 is non-rotatable in the accommodating hole 221 about the axial direction so as fix the orientation of the fork unit 25, thereby ensuring the forward moving direction of the carriage.

(iii) Provision of the brake device 90 permits the carriage of the present invention to be stopped as desired.

With this invention thus explained, it is apparent that numerous modifications and variations can be made without departing from the scope and spirit of this invention. It is therefore intended that this invention be limited only as indicated in the appended claims.

What is claimed is:

1. A carriage comprising:

a carriage frame having a wheeled rear frame portion and a front wheel-carrying frame portion, said front wheel-carrying frame portion having a lowermost section that defines a vertical accommodating hole which extends in an axial direction;

a front wheel unit including;

a fork mounting member disposed rotatably in said accommodating hole, and having a fork connecting portion that extends downwardly and outwardly of said accommodating hole, and a retaining portion opposite to said fork connecting portion in said axial direction, a fork unit having an upper end fixed to said fork connecting portion of said fork mounting member and co-rotatable therewith, and a lower end with a wheel mounted rotatably thereon about a horizontal axis, and a locking member provided on said lowermost section of said front wheel-carrying frame portion for retaining rotatably said retaining portion of said fork mounting member in said accommodating hole;

said locking member operable to move from an unlocking state, where said fork mounting member is rotatable in said accommodating hole about said axial direction, to a locking state, where said fork mounting member is restrained from rotating inside said accommodating hole about said axial direction;

said retaining portion of said fork mounting member is formed with an annular retaining groove therearound;

said lowermost section of said front wheel-carrying frame portion being formed with a radial bore that is registered with said retaining groove;

said locking member including a locking bolt that is retained on said lowermost section of said front wheel-carrying frame portion, that extends through said radial bore and into said retaining groove, and that abuts tightly against said retaining portion of said fork mounting member inside said retaining groove when operated to the locking state;

said lowermost section of said front wheel-carrying frame portion is formed with a tubular socket that projects radially and outwardly therefrom and that is coaxial with said radial bore; and, said socket being formed with an internal screw thread, said locking bolt having a shank portion that is disposed in said socket and that extends through said radial bore and into said retaining groove, and an externally threaded head portion that is connected to said shank portion and that is formed with an external screw thread to engage threadedly said internal screw thread of said socket.

2. The carriage as defined in claim 1, wherein:

said locking member further includes a biasing spring disposed in said socket and sleeved on said shank portion of said locking bolt, said biasing spring having a first end that abuts against said head portion of said locking bolt, and a second end that abuts against said lowermost section of said front wheel-carrying frame portion.

3. A carriage comprising:

a carriage frame having a wheeled rear frame portion and a front wheel-carrying frame portion, said front wheel-carrying frame portion having a lowermost section that defines a vertical accommodating hole which extends in an axial direction;

a front wheel unit including;
- a fork mounting member disposed rotatably in said accommodating hole, and having a fork connecting portion that extends downwardly and outwardly of said accommodating hole, and a retaining portion opposite to said fork connecting portion in said axial direction,
- a fork unit having an upper end fixed to said fork connecting portion of said fork mounting member and co-rotatable therewith, and a lower end with a wheel mounted rotatably thereon about a horizontal axis, and
- a locking member provided on said lowermost section of said front wheel-carrying frame portion for retaining rotatably said retaining portion of said fork mounting member in said accommodating hole;

said fork mounting member is formed with a cable passage that extends in said axial direction;

a brake lever mounted on said carriage frame;

a brake device mounted on said fork unit;

a brake cable unit extending through said cable passage in said fork mounting member and interconnecting said brake lever and said brake device such that operation of said brake lever enables said brake device to brake said wheel;

said brake cable unit including;
- a hollow shuttle casing retained in said cable passage and having an upper portion, a lower portion, and a shuttle receiving space that extends between said upper and lower portions in said axial direction;
- a shuttle member movably disposed in said shuttle receiving space;
- a first brake cable having a first end connected to said brake lever and a second end that extends through said upper portion of said shuttle casing and that is connected to said shuttle member;
- a second brake cable having a first end connected to said brake device and a second end that extends through said lower portion of said shuttle casing and that is connected rotatably to said shuttle member; and,
- said shuttle casing includes interconnected upper and lower casing parts, said lower casing part being secured in said cable passage, said upper casing part extending upwardly and outwardly of said cable passage.

4. A carriage comprising:

a carriage frame having a wheeled rear frame portion and a front wheel-carrying frame portion, said front wheel-carrying frame portion having a lowermost section that defines a vertical accommodating hole which extends in an axial direction;

a front wheel unit including;
- a fork mounting member disposed rotatably in said accommodating hole, and having a fork connecting portion that extends downwardly and outwardly of said accommodating hole, and a retaining portion opposite to said fork connecting portion in said axial direction,
- a fork unit having an upper end fixed to said fork connecting portion of said fork mounting member and co-rotatable therewith, and a lower end with a wheel mounted rotatably thereon about a horizontal axis,
- a locking member provided on said lowermost section of said front wheel-carrying frame portion for retaining rotatably said retaining portion of said fork mounting member in said accommodating hole said fork mounting member is formed with a cable passage that extends in said axial direction, said carriage frame further comprising;
- a brake lever mounted on said carriage frame;
- a brake device mounted on said fork unit;
- a brake cable unit extending through said cable passage in said fork mounting member and interconnecting said brake lever and said brake device such that operation of said brake lever enables said brake device to brake said wheel; said brake cable unit includes:
- a hollow shuttle casing retained in said cable passage and having an upper portion, a lower portion, and a shuttle receiving space that extends between said upper and lower portions in said axial direction;
- a shuttle member movably disposed in said shuttle receiving space;
- a first brake cable having a first end connected to said brake lever and a second end that extends through said upper portion of said shuttle casing and that is connected to said shuttle member; and
- a second brake cable having a first end connected to said brake device and a second end that extends through said lower portion of said shuttle casing and that is connected rotatably to said shuttle member; and,
- said shuttle is formed with a cavity that extends in said axial direction and that has opposite first and second end walls, said first end wall being formed with a radial slit communicated with said cavity, said second end of said first brake cable extending through said radial slit in said first end wall and being formed with a retaining stud that is disposed in said cavity and that abuts against said first end wall, said second end wall being formed with a cable hole communicated with said cavity, said second end of said second brake cable extending rotatably through said cable hole in said second end wall and being formed with a stop that is disposed in said cavity and that abuts against said second end wall.

5. The carriage as defined in claim 4, further comprising:

at least one washer sleeved on said second end of said second brake cable and disposed between said stop and said second end wall.

6. The carriage as defined in claim 5, wherein said washer is made of metal.

7. The carriage as defined in claim 5, wherein said washer is made of plastic.

* * * * *